United States Patent [19]

Shimizu et al.

[11] Patent Number: 5,155,645
[45] Date of Patent: Oct. 13, 1992

[54] MAGNETIC HEAD WITH IMPROVED EFFICIENCY IN BOTH HIGH AND LOW FREQUENCY RANGES

[75] Inventors: Tsukasa Shimizu, Yao; Yoshiaki Shimizu, Minoo; Jyoichi Tamada, Nara; Hiroyuki Okuda, Daito; Takao Yamano, Daito; Kazuo Ino, Daito; Koso Ishihara, Daito; Takashi Ogura, Daito, all of Japan

[73] Assignee: Sanyo Electric Co., Ltd., Osaka, Japan

[21] Appl. No.: 611,574

[22] Filed: Nov. 13, 1990

[30] Foreign Application Priority Data

Nov. 14, 1989 [JP] Japan .................... 1-295934

[51] Int. Cl.$^5$ .............................. G11B 5/187
[52] U.S. Cl. .................................... 360/126
[58] Field of Search ............ 360/125, 126, 127

[56] References Cited

U.S. PATENT DOCUMENTS

4,369,477  1/1983  Haraoka .................. 360/125
4,890,378  1/1990  Suzuki et al. .......... 360/127

Primary Examiner—David J. Severin
Attorney, Agent, or Firm—Nikaido, Marmelstein, Murray & Oram

[57] ABSTRACT

A magnetic head has a pair of magnetic core halves opposed to each other with a non-magnetic material posed therebetween to form a magnetic gap, which head includes a pair of magnetic core halves, a first ferromagnetic metal thin film and a second ferromagnetic metal thin film. The magnetic core halves are formed of ferromagnetic oxide such as Mn-Zn ferrite, and they have opposing surfaces opposed to each other to provide the magnetic gap. The first ferromagnetic metal thin film formed of Fe-Si-Al alloy is formed at least on one of the opposing surfaces. The second ferromagnetic metal thin film formed of Fe-Si-Al alloy having different constituent ratio from the first ferromagnetic metal thin film is formed between the magnetic gap and the first ferromagnetic metal thin film. The flux density of the second ferromagnetic metal thin film induced when a magnetic field of 1.2K oersted is applied exceeds 1000 gauss. The ratio of the saturation flux density of the second ferromagnetic metal thin film to that of the first ferromagnetic metal thin film is not higher than 0.6. The self recording reproducing capability of the magnetic head is not degraded in the high frequency region, and the self recording reproducing capability in the low frequency region is increased.

8 Claims, 8 Drawing Sheets

MAGNETIC HEAD WITH IMPROVED EFFICIENCY IN BOTH HIGH AND LOW FREQUENCY RANGES

BACKGROUND OF THE INVENTION

1. Field of the Invention

The invention relates to a magnetic head and, more specifically, to a magnetic head used in a magnetic recording/reproducing apparatus such as a video tape recorder (VTR), and a digital audio tape recorder (DAT).

2. Description of the Background Art

Recently, density of recording signals have come to be increased in magnetic recording/reproducing apparatuses such as VTRs and DATs. Corresponding to the higher density recording, metal tapes having higher coercive force using ferromagnetic metal powder such as Fe, Co or Ni as magnetic powder have come to be used. For example, in a compact VTR called a 8 mm video tape recorder, a metal tape having coercive force as high as about Hc=1400 to 1500 oersted is used. The reason for this is that a recording media capable of shortening recording wavelength of signals have been desired, in order to increase recording density to reduce the size of the magnetic recording/reproducing apparatus.

When a conventional magnetic head formed only of ferrite is used for recording on the metal tape, performance of the metal tape cannot be fully exhibited, since magnetic saturation phenomenon occurs as saturation flux density of ferrite is about 5500 gauss at the highest. A magnetic head corresponding to a metal tape having high coercive force must satisfy the following conditions required for a magnetic head, that is, high-frequency characteristics and high wear resistance of the magnetic core as well as higher saturation flux density near a gap of the magnetic core. A magnetic head (called a composite type magnetic head) used for the metal tape satisfying these conditions has been proposed in which a portion near the magnetic gap, where magnetic saturation phenomenon tends to occur most frequently, is formed by a metal magnetic material (for example, permalloy, sendust, amorphous magnetic material) having higher saturation flux density than that of ferrite used for magnetic cores. The composite type magnetic head has superior reliability, magnetic characteristics and wear resistance.

Figure 10:
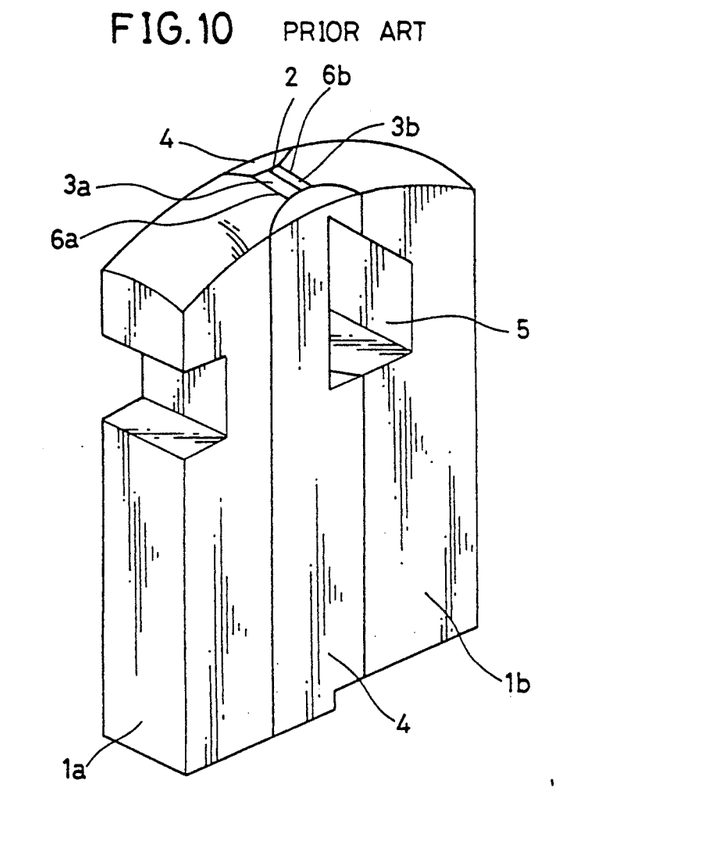
FIG. 10 is a perspective view showing an appearance of a conventional magnetic head.
Figure 11:
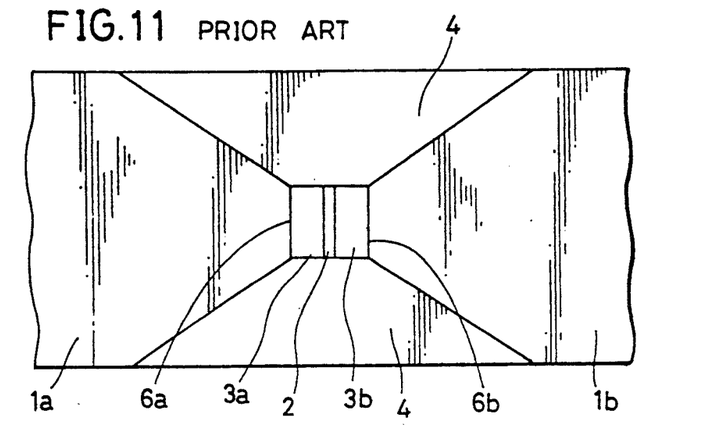
FIG. 11 is a plan view showing a tape contact surface of the magnetic head of FIG. 10.

FIG. 10 is a perspective view showing appearance of a conventional magnetic head, and FIG. 11 shows a tape contact surface of the magnetic head of FIG. 10. In the conventional magnetic head, ferromagnetic metal thin films 3a and 3b formed of sendust or the like having high saturation flux density are provided near a magnetic gap 2 consisted of a pair of magnetic core halves 1a and 1b of ferromagnetic oxide such as Mn-Zn ferrite facing to each other with a non-magnetic material posed therebetween. The magnetic core halves 1a and 1b are joined by glass 4 with a coil groove 5 being provided. In the magnetic head, the boundaries 6a and 6b between the magnetic core halves 1a and 1b and the ferromagnetic metal thin films 3a and 3b are in parallel with the direction of track width of the magnetic gap 2.

Figure 12:
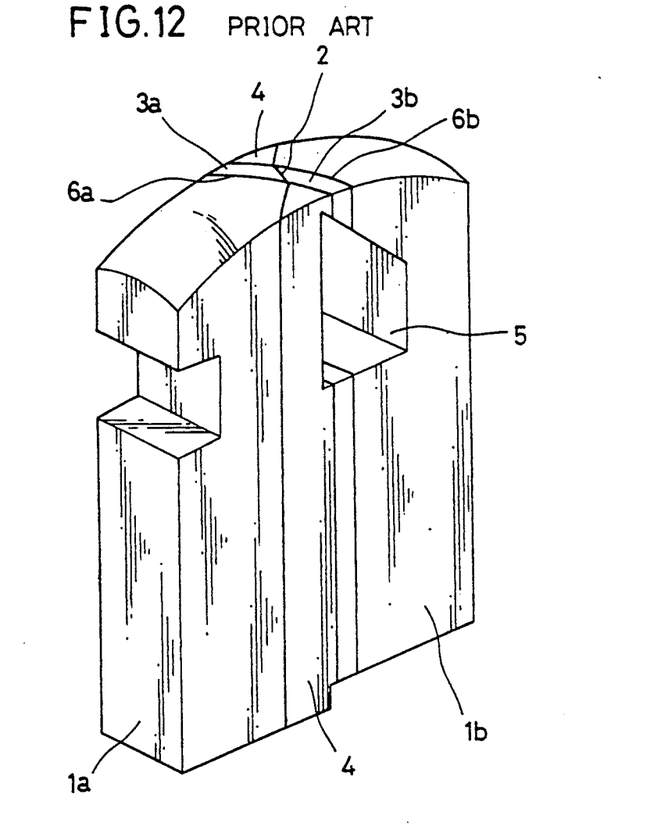
FIG. 12 is a perspective view showing an appearance of a magnetic head of another conventional example.
Figure 13:
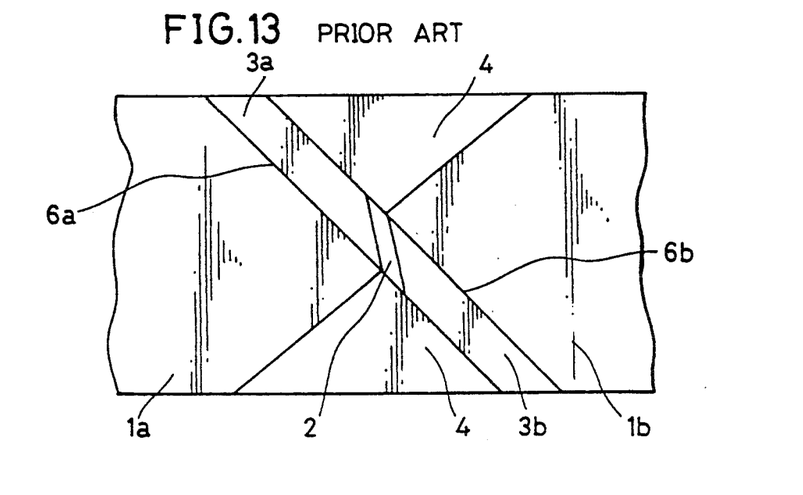
FIG. 13 is a plan view showing a tape contact surface of the magnetic head of FIG. 12.

FIG. 12 is a perspective view showing an appearance of another example of a conventional composite type magnetic head, and FIG. 13 shows the tape contact surface of the magnetic head. In this magnetic head, the boundaries 6a and 6b between the magnetic core halves 1a and 1b and the ferromagnetic metal thin films 3a and 3b are inclined and not in parallel with the forming surface of the magnetic gap 2. It is a structure of a composite type magnetic head proposed to prevent bad influences of a possible pseudo gap to the performance of the magnetic head.

Generally, in the magnetic heads shown in FIGS. 12 and 13, the track width of the magnetic gap 2 is related to the film thickness of the ferromagnetic metal thin films 3a and 3b. Therefore, the thickness of the ferromagnetic metal thin films 3a and 3b is about 20 to 30 $\mu$m. Meanwhile, in the magnetic head shown in FIGS. 10 and 11, the track width of the magnetic gap 2 is not related to the thickness of the ferromagnetic metal thin films 3a and 3b, so that the thickness of the ferromagnetic metal thin films 3a and 3b is as thin as 5 $\mu$m. Accordingly, the magnetic head of FIG. 10 is superior in production yield and cost efficiency compared with that shown in FIG. 12. However, magnetic saturation tends to occur in low frequency region during recording since the ferromagnetic metal thin films 3a and 3b are thin in the magnetic head of FIG. 10, so that the self recording/reproducing capability in low frequency region is low.

Japanese Patent Laying-Open No. 62-177714 discloses a magnetic head in which gap length is changed in recording and reproducing by providing a magnetic thin film having saturation flux density of 500 gauss or less at the gap junction surface of the pair of magnetic core halves, in order to improve recording efficiency to a magnetic tape having high coercive force. However, in this magnetic head, saturation occurs even at a small flux as the saturation flux density of the magnetic thin film is as small as 500 gauss or less, which enlarges the substantial gap length, and therefore it was difficult to effectively reproduce high frequency signals.

SUMMARY OF THE INVENTION

An object of the present invention is to provide a magnetic head having improved self recording reproducing capability in low frequency region while maintaining self recording reproducing capability in high-frequency region.

The present invention provides a magnetic head having a magnetic gap formed by a pair of magnetic core halves opposed to each other with a non-magnetic material posed therebetween, comprising a pair of magnetic core halves, a first ferromagnetic thin film and a second ferromagnetic thin film. The pair of magnetic core halves is formed of a ferromagnetic oxide and has opposing surfaces opposed to each other to form the magnetic gap. The first ferromagnetic thin film is formed at least on one of the opposing surfaces. The second ferromagnetic thin film is formed between the magnetic gap and the first ferromagnetic thin film The magnetic flux density of the second ferromagnetic thin film induced when magnetic field of 1.2K oersted is applied exceeds 1000 gauss. Ratio of saturation flux density of the second ferromagnetic thin film to that of the first ferromagnetic thin film is not higher than 0.6.

In accordance with a preferred embodiment of the present invention, the flux density of the second ferromagnetic thin film when a magnetic filed of 1.2K oersted is applied exceeds 2000 gauss. The first and second ferromagnetic thin films include an alloy of the same component elements with the constituent ratio being different. Preferably, the alloy is Fe-Si-A$\rho$ alloy. Preferably a diffusion preventing film formed of $SiO_2$ or the like is formed between the first and second ferromagnetic thin films.

In the magnetic head of the present invention, the second ferromagnetic thin film is magnetically saturated during recording in the low frequency region, enlarging substantial gap length, increasing leakage magnetic flux density at portions apart from the magnetic gap, thereby improving recording efficiency. In reproduction at the low frequency region, magnetic flux so high as to cause magnetic saturation of the second ferromagnetic thin film is not generated. Therefore, only the original magnetic gap serves as the magnetic gap, and therefore the gap length is not enlarged. Therefore, the reproduction efficiency is not lowered in the low frequency region. Even if magnetic saturation occurs in the second ferromagnetic thin film during reproduction in the low frequency region, enlarging the substantial gap length, the gap loss is small as the reproduction is in the low frequency region, and therefore reproduction efficiency is not lowered.

Meanwhile, if magnetic saturation occurs in the second ferromagnetic thin film during reproduction at a high-frequency region, the substantial gap length becomes larger than an originally set value. However, the flux density of the second ferromagnetic thin film when a magnetic filed of 1.2K oersted is applied exceeds 1000 gauss, so that magnetic saturation does not occur in the second ferromagnetic thin film during reproduction at the high-frequency region. During recording at a high-frequency region, the recording efficiency is not so much dependent on the gap length as in reproduction. Therefore, the self recording reproducing capability is not degraded in the high-frequency region either.

As described above, according to the present invention, a magnetic head having improved self recording reproducing capability in the low frequency region without lowering self recording reproducing capability at a high-frequency region can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described in detail with reference to the figures.

Figure 1:
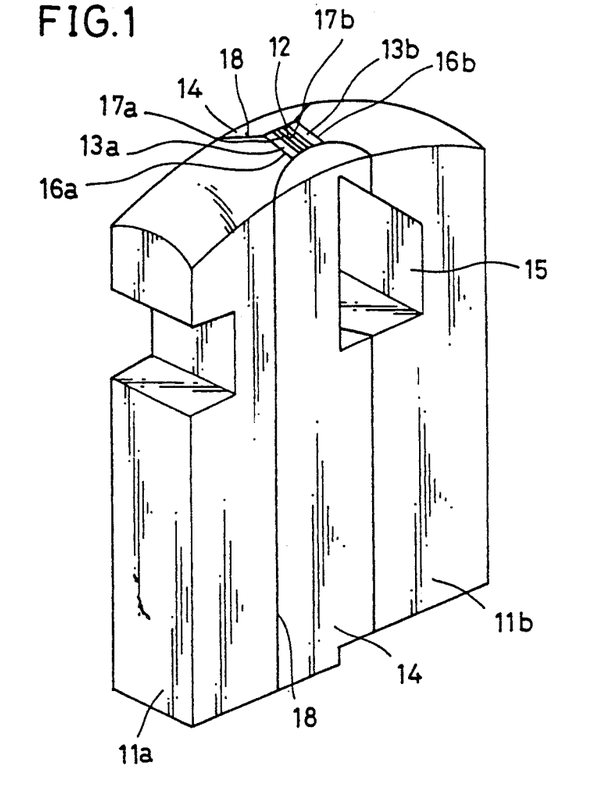
FIG. 1 is a perspective view showing an appearance of one embodiment of a magnetic head in accordance with the present invention.
Figure 2:
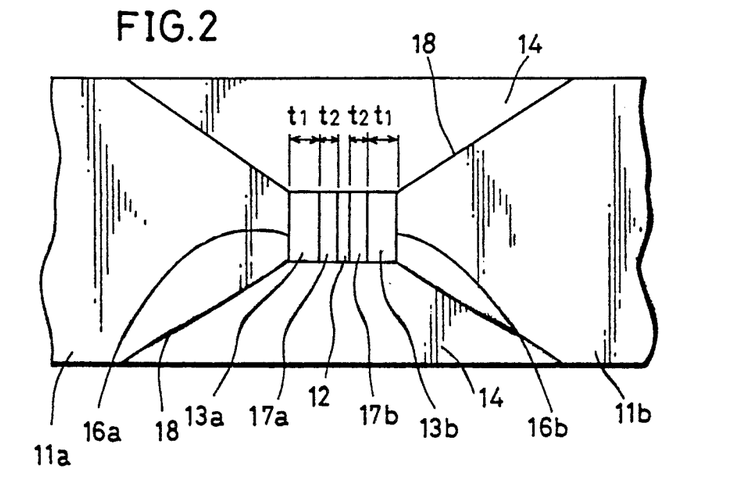
FIG. 2 is a plan view showing a tape contact surface of the magnetic head of FIG. 1.

Referring to FIGS. 1 and 2, a magnetic gap 12 is formed by a pair of magnetic core halves 11a and 11b of Mn-Zn ferrite opposed to each other with a non-magnetic material posed therebetween. The magnetic gap 12 has a gap length of about 0.2 to 0.3 μm. First ferromagnetic metal thin films 13a and 13b of a Fe-Si-Aρ alloy having high saturation flux density are formed by sputtering or the like on opposing surfaces 16a and 16b of the magnetic core halves 11a and 11b opposing to each other to form the magnetic gap 12. Second ferromagnetic thin films 17a and 17b of Fe-Si-Aρ alloy are formed by sputtering or the like on the first ferromagnetic metal thin films 13a and 13b on the side of the magnetic gap 12, with diffusion preventing films having the thickness of about 50 Å formed of $SiO_2$ or the like (not shown in FIGS. 1 and 2) posed therebetween. Alternatively, the second ferromagnetic metal thin films 17a and 17b are formed of an alloy with at least one element selected from the group consisted of Ti, V, Cr, Zr, Nb, Mo, Hf, Ta and W added to the Fe-Si-Aρ alloy. The constitution of the second ferromagnetic metal thin films 17a and 17b is adjusted such that the magnetic flux density (hereinafter further to as flux density $B_{1.2K}$) induced when a magnetic field of 1.2K oersted is applied becomes a prescribed value.

The magnetic flux density $B_{1.2K}$ of the magnetic core halves 11a and 11b is 5300 gauss. The magnetic flux density $B_{1.2K}$ of the first ferromagnetic metal thin films 13a and 13b is 1000 gauss, and the saturation flux density $B_{S1}$ is 10000 gauss. Thickness of the first ferromagnetic thin films 13a and 13b is 6 μm. The composition of the Fe-Si-Aρ alloy forming the first ferromagnetic metal thin films 13a and 13b comprises Aρ of 5.5 wt %, Si of 10.0 wt % and Fe of 84.5 wt %.

The pair of magnetic core halves 11a and 11b are joined by glass 14 filled in a groove 18 defining track width of the magnetic gap 12 such that the second ferromagnetic metal thin films 17a and 17b are opposed to each other with a non-magnetic material constituting the magnetic gap 12 posed therebetween. The boundary surfaces 16a and 16b between the magnetic core halves 11a and 11b and the first ferromagnetic metal thin films 13a and 13b are in parallel with the track width direction of the magnetic gap 12.

The self recording reproducing outputs of the magnetic head having such a structure as shown in FIGS. 1 and 2 in the low frequency region (DC magnetic field) when the saturation flux density $B_{S2}$ of the second ferromagnetic metal thin films 17a and 17b is 2000, 4000, 6000, 8000, 10000 and 18000 gauss are provided in accordance with static magnetic field analysis based on computer simulation of finite element method. The self recording reproducing output means reproduction output when the magnetic head reproduces magnetization pattern recorded by itself on a magnetic media. Namely, the self recording reproducing output simultaneously evaluates in composite manner the recording and reproducing efficiencies. Therefore, the recording efficiency cannot be evaluated only by the self recording reproducing output. However, if reproduction efficiency is the same in different magnetic heads to be compared with each other, the recording efficiency can be compared and evaluated based on the self recording reproducing output.

Figure 3:
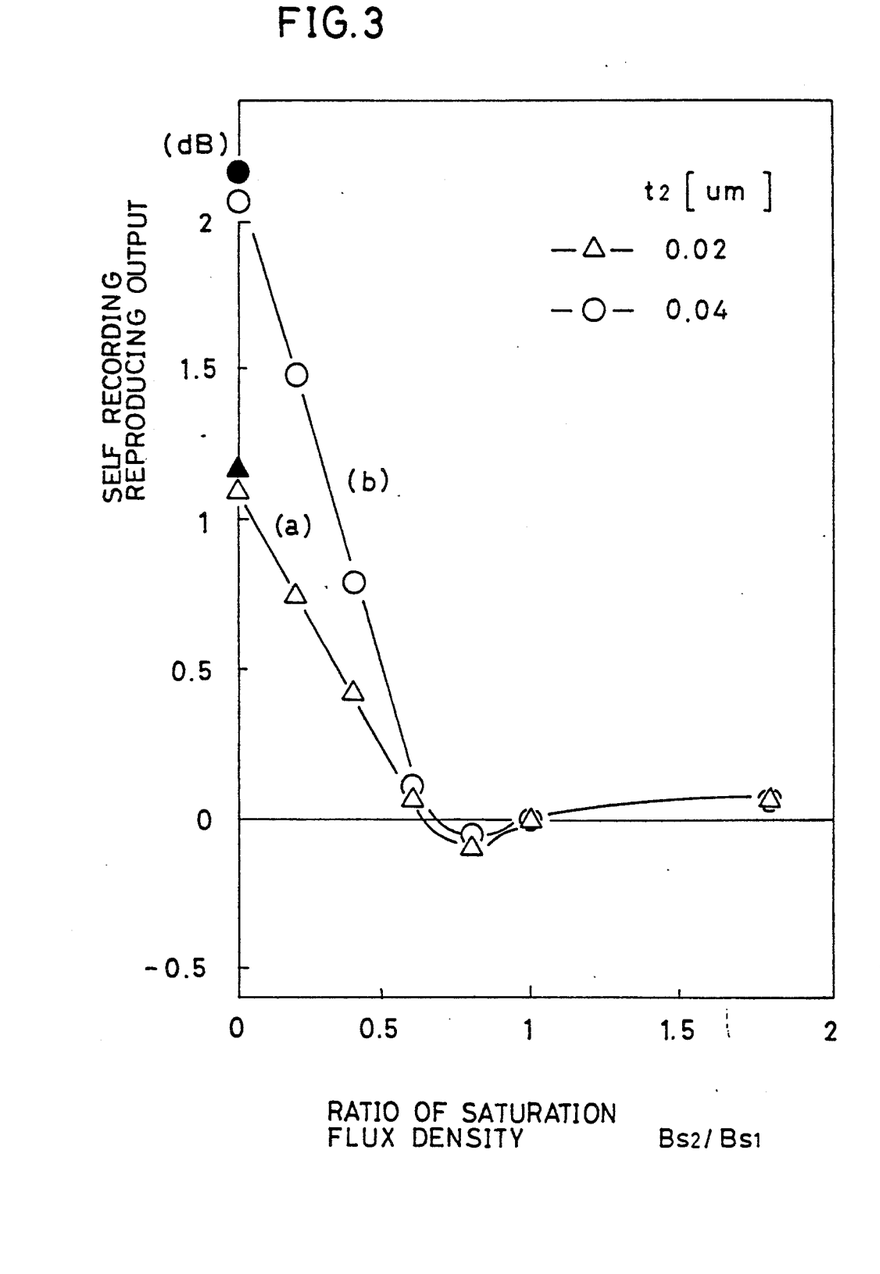
FIG. 3 shows a relation between ratio of saturation flux density and self recording reproducing output of the second ferromagnetic thin film to the first ferromagnetic thin film in the magnetic head of the present invention.

FIG. 3 shows a result of the above analysis. Referring to FIG. 3, the ordinate represents values of reproducing outputs of the magnetic heads with a reproducing output of a magnetic head having the saturation flux density $B_{S2}$ of the second ferromagnetic metal thin films 17a and 17b of 10000 gauss (corresponding to a conventional magnetic head) used as a reference. The abscissa represents the ratio $B_{S2}/B_{S1}$ of the saturation flux density $B_{S2}$ of the second ferromagnetic metal thin films 17a and 17b to the saturation flux density $B_{S1}$ of the first ferromagnetic metal thin films 13a and 13b. In the figure, the curve (a) shows a case in which the thickness t2 of the second ferromagnetic metal thin films 17a and 17b is 0.02 $\mu$m, and the curve (b) shows a case in which the thickness t2 of the second ferromagnetic metal thin films 17a and 17b is 0.04 $\mu$m. For comparison, the same analysis is carried out on a magnetic head having the second ferromagnetic metal thin films 17a and 17b formed of a non-magnetic material (whose saturation flux density $B_{S2}$ is 0 gauss), that is, the gap length thereof is twice that of the film thickness t2 of the second ferromagnetic metal thin films 17a and 17b. In FIG. 3, the black circle and the black triangle denote measured values.

As is apparent from FIG. 3, the self recording reproducing output of a magnetic head having the ratio of saturation flux density $B_{S2}/B_{S1}$ of more than 0.6 is approximately the same as that of the conventional magnetic head whose ratio of saturation flux density $B_{S2}/B_{S1} = 1$. Meanwhile, the self recording reproducing output of a magnetic head whose ratio of saturation flux density $B_{S2}/B_{S1}$ is 0.6 or less is significantly higher than that of the conventional magnetic head. The reason for this is that recording efficiency in low frequency region is increased in the magnetic head whose ratio of saturation flux density is $B_{S2}/B_{S1}$ is 0.6 or less, since magnetic saturation occurs in the second ferromagnetic metal thin films during recording low frequency signals, enlarging substantial gap length. In reproduction, even if the substantial gap length is enlarged due to magnetic saturation in the second ferromagnetic metal thin films, the gap loss is small as low frequency regions are reproduced, and therefore the self recording reproducing output is not degraded. Namely, the self recording reproducing output in the low frequency region is increased when the ratio of saturation flux density of the first and second ferromagnetic metal thin films $B_{S2}/B_{S1}$ is not higher than 0.6.

Figure 4:
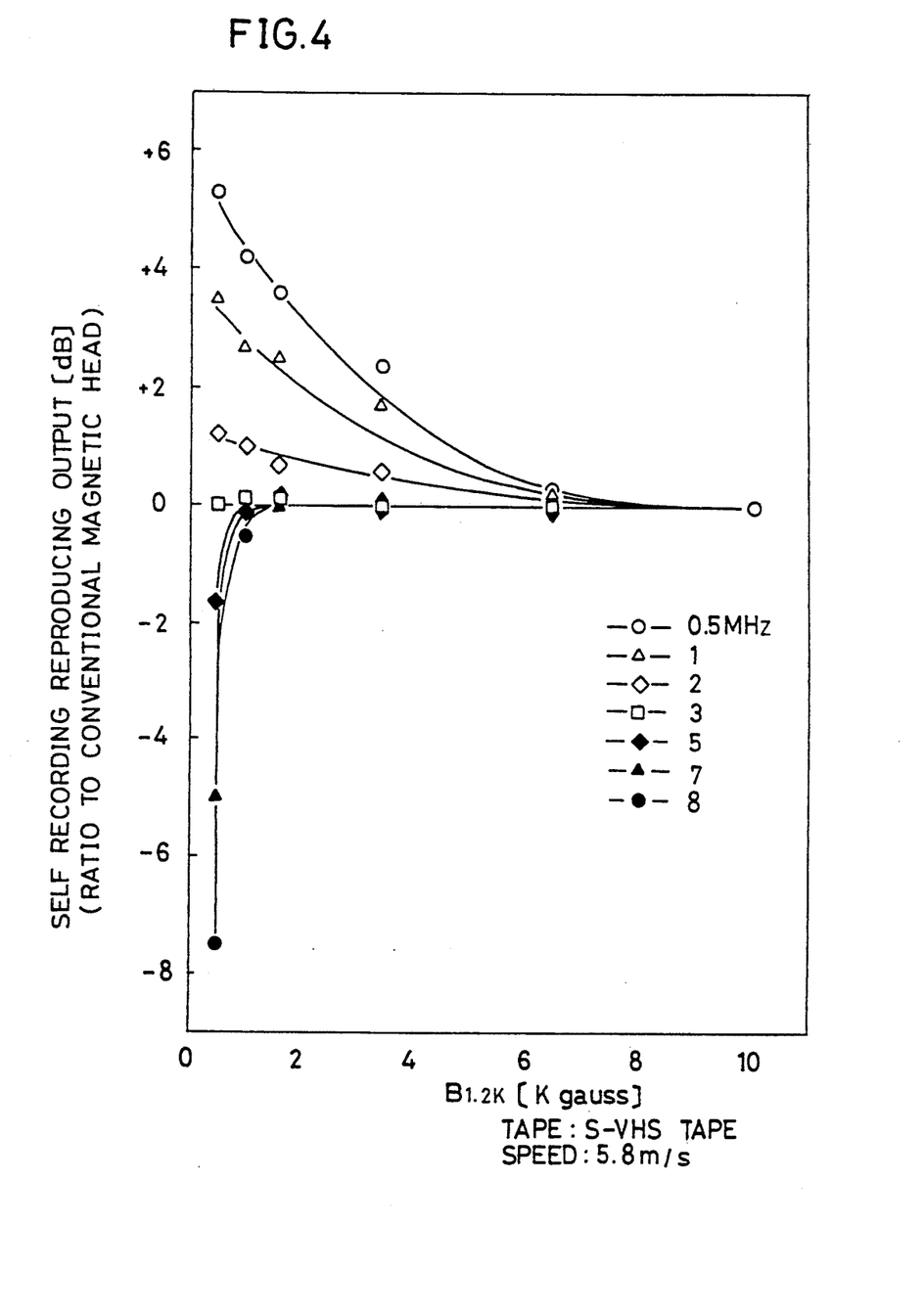
FIG. 4 shows a relation between the flux density and the self recording reproducing output of the second ferromagnetic thin film when a magnetic field of 1.2K oersted is applied.

Meanwhile, in the high-frequency region, when magnetic saturation occurs in the second ferromagnetic metal thin films, the gap loss is increased since substantial gap length is enlarged. The increased of the gap loss degrades the self recording reproducing output (especially reproducing output). Therefore, in order to prevent degradation of the self recording reproducing output in the high-frequency region and maintain a constant value, a lower limit of the flux density $B_{1.2K}$ of the second ferromagnetic metal thin film must be provided. The following experiment is carried out to confirm the lower limit. Namely, magnetic heads whose flux density $B_{1.2K}$ of the second ferromagnetic metal thin films 17a and 17b are 500, 1000, 1600, 3400, 6400 and 10000 gauss respectively, and whose film thickness t2 of the second ferromagnetic metal thin films 17a and 17b is 0.12 $\mu$m are prepared and the self recording reproducing outputs thereof are measured. The result is shown in FIG. 4. In FIG. 4, the ordinate represents values of self recording reproducing outputs of respective magnetic heads, with the reproduction output of a conventional magnetic head whose flux density $B_{1.2K}$ of the second ferromagnetic metal thin films 17a and 17b is 10000 gauss being a reference. The abscissa represents values of the flux density $B_{1.2K}$ of the second ferromagnetic metal thin films 17a and 17b. The constituent ratio of Fe-Si-A$\rho$ alloy forming the second ferromagnetic metal thin films 17a and 17b used are as shown in FIG. 1.

TABLE 1

| Flux Density $B_{1.2K}$ | Constituent ratio [wt. %] | | |
|---|---|---|---|
| (Gauss) | Al | Si | Fe |
| 500 | 12.5 | 12.6 | 74.9 |
| 1000 | 11.5 | 13.0 | 75.5 |
| 1600 | 10.0 | 12.8 | 77.2 |
| 3400 | 9.1 | 12.7 | 78.2 |
| 6400 | 7.0 | 11.5 | 81.5 |
| 10000 | 5.5 | 10.0 | 84.5 |

The measurement of the self recording reproducing output is done by using a S-VHS (High Definition VTR Systems) tape having the coercive force Hc of about 900 oersted, with relative speed being 5.8 m/sec. Conditions of measuring the flux density $B_{1.2K}$ are as follows. Namely, an external magnetic force of 1.2K oersted is applied to a ferromagnetic metal thin film having the thickness of 1.2 $\mu$m formed on a non-magnetic substrate of 5×5 mm$^2$ parallel to the surface of the film, the magnetic flux density induced in the film surface at that time is measured, and the magnetic flux density at that time is defined as $B_{1.2K}$. A vibrating sample magnetometer (VSM) is used as the measuring apparatus.

As is apparent from FIG. 4, when the flux density $B_{1.2K}$ of the second ferromagnetic metal thin film becomes smaller than 1000 gauss, the self recording reproducing output in the high-frequency region (in the figure, 5, 7 and 8 MHz) is significantly reduced compared with the conventional magnetic head. The reason for this is that in a magnetic head whose flux density $B_{1.2K}$ of the second ferromagnetic metal thin film is smaller than 1000 gauss, magnetic saturation occurs in the second ferromagnetic metal thin film during reproduction, enlarging the substantial gap length to increase gap loss, so that the reproduction efficiency in the high-frequency region is reduced. In view of this result, the flux density $B_{1.2K}$ of the second ferromagnetic metal thin film must be larger than 1000 gauss in order to suppress reduction of self recording reproducing output in the high-frequency region to be not higher than 1 dB. Preferably, in order to maintain the self recording reproducing output in the high-frequency region as high as that of the conventional magnetic head, the flux density $B_{1.2K}$ of the second ferromagnetic metal thin film must be made larger than 2000 gauss.

When the flux density $B_{1.2K}$ of the second ferromagnetic metal thin film is smaller than 6400 gauss, the self recording reproducing output in the low frequency region (in the figure, 0.5, 1.2 MHz) is higher than that of the conventional magnetic head. The result is approximately the same as the result of the aforementioned computer simulation.

Therefore, in order to surely maintain the self recording reproducing output in the high-frequency region and to increase self recording reproducing output in the low frequency region, the magnetic flux density $B_{1.2K}$ of the second ferromagnetic metal thin film must be larger than 1000 gauss and the ratio $B_{S2}/B_{S1}$ of the saturation flux density $B_{S2}$ of the second ferromagnetic metal thin film to the saturation flux density $B_{S1}$ of the first ferromagnetic metal thin film must be not higher than 0.6.

Now, the optical gap length of the magnetic heads used in the above measurement are measured, which were 0.28 μm in all the magnetic heads. However, the effective gap length measured based on the null point derived from the gap loss was 0.33 μm in a magnetic head whose flux density $B_{1.2K}$ of the second ferromagnetic metal thin film is 1000, 1600, 3400, 6400 and 10000, respectively, while it was 0.54 μm in the magnetic head whose flux density $B_{1.2K}$ is 500 gauss. The reason for this may be that the flux density $B_{1.2K}$ of the second ferromagnetic metal thin film is too small.

The gap loss $L_g$ is provided by the following equation.

$$L_g = -20 \log \frac{\sin(\pi g/\lambda)}{\pi/\lambda} \text{ [dB]}$$

g:effective gap length
λ:recording wavelength

According to this equation, the gaps loss becomes infinite and the reproduction output becomes 0 when g=n λ (n:natural number) in principle. Therefore, the point at which g=n λ is called a null point. The gap length comprises an optical gap length and an effective gap length. The optical gap length is the appearance gap length measured by using an optical microscope or an electron microscope. However, portions of the magnetic core in contact with the gap has the magnetic characteristic degraded to some extent, so that the magnetic gap length is usually different from the optical gap length. The magnetic gap length is referred to as the effective gap length. In actual measurement of the gap length, a frequency sweep signal is recorded and reproduced, and the effective gap length is determined based on the relation between the frequency f=v/λ and g=n λ where the null point appears.

The above described measurement is also carried out by using a metal tape having the coercive force of 1400 to 1500 oersted instead of S-VHS tape, with the relative speed of 3.8 m/sec (based on the specification of 8 mm VTR), and the same result as above are provided.

Figure 5:
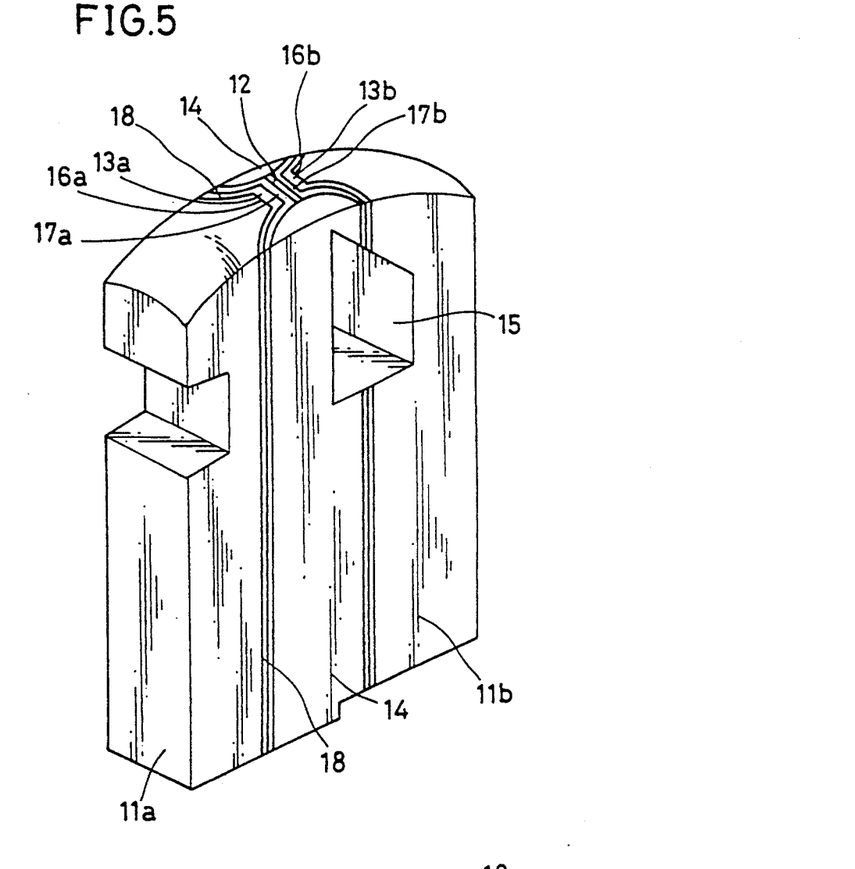
FIG. 5 is a perspective view showing an appearance of another embodiment of the magnetic head in accordance with the present invention.
Figure 6:
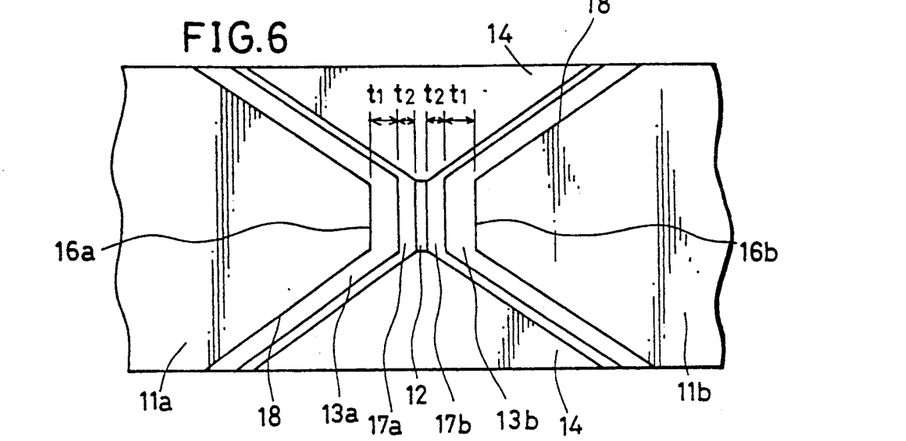
FIG. 6 is a plan view showing a tape contact surface of the magnetic head of FIG. 5.

Referring to FIGS. 5 and 6, in another embodiment of the magnetic head of the present invention, the first and second ferromagnetic metal thin films 13a, 13b and 17a and 17b are formed to reach the bottom surface of the groove 18.

The structure of the present invention is not limited to the above embodiments, and in a magnetic head in which the boundary between the magnetic core halves and the ferromagnetic metal thin films is inclined about the forming surface of the magnetic gap such as shown in FIG. 12, the present invention can be applied to increase self recording reproducing output in the low frequency region without degrading the self recording reproducing output in the high-frequency region.

Figure 7:
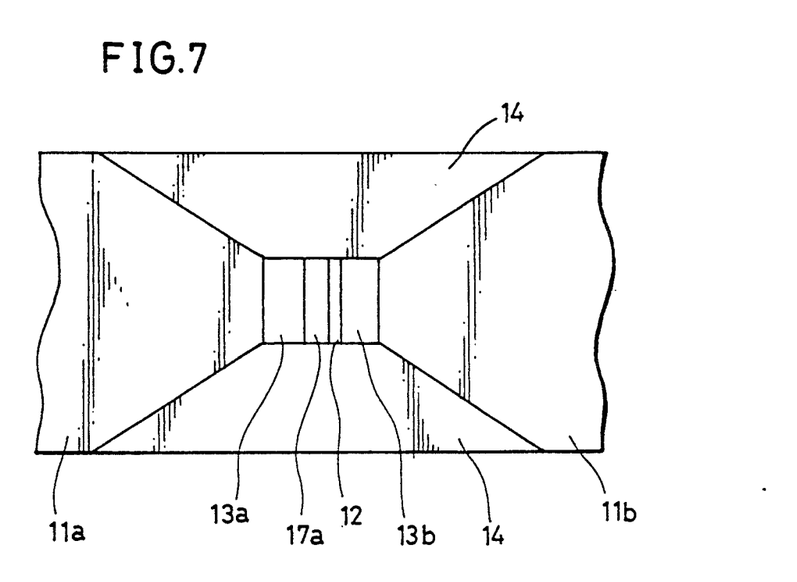
FIG. 7 is a plan view showing a tape contact surface of a further embodiment of the magnetic head in accordance with the present invention.
Figure 8:
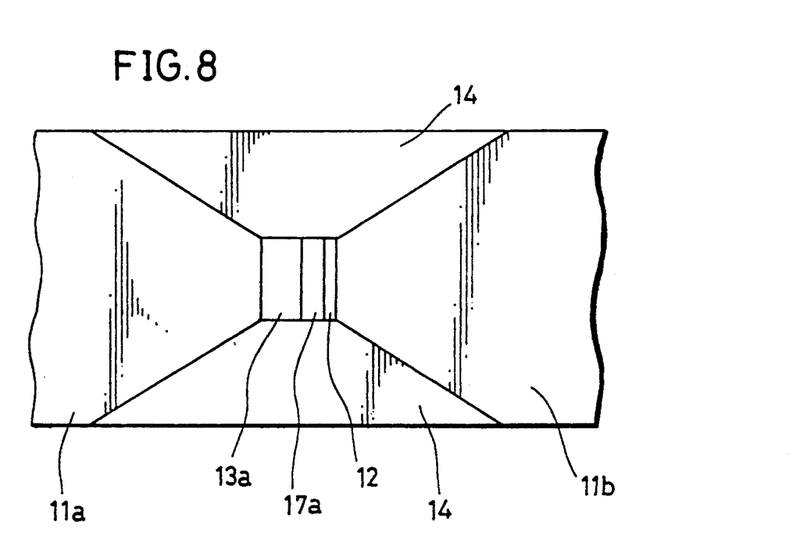
FIG. 8 is a plan view showing a tape contact surface of a still further embodiment of the magnetic head in accordance with the present invention.

Although a magnetic head in which the first and second ferromagnetic metal thin films are formed on both opposing surfaces of the magnetic core halves opposed to each other to form a magnetic gap has been described in the above embodiments, the present invention is not limited to the magnetic heads having such a structure. For example, as shown in FIG. 7, the first ferromagnetic metal thin films 13a and 13b may be formed on a pair of magnetic core halves 11a and 11b and the second ferromagnetic metal thin film 17a may be formed only on the first ferromagnetic metal thin film 13a of one magnetic core half 11a. The first and second ferromagnetic metal thin films 13a and 17a may be formed on only one magnetic core half 11a, as shown in FIG. 8. The effect of the present invention described above can be provided in the magnetic heads having such structures.

Figure 9:
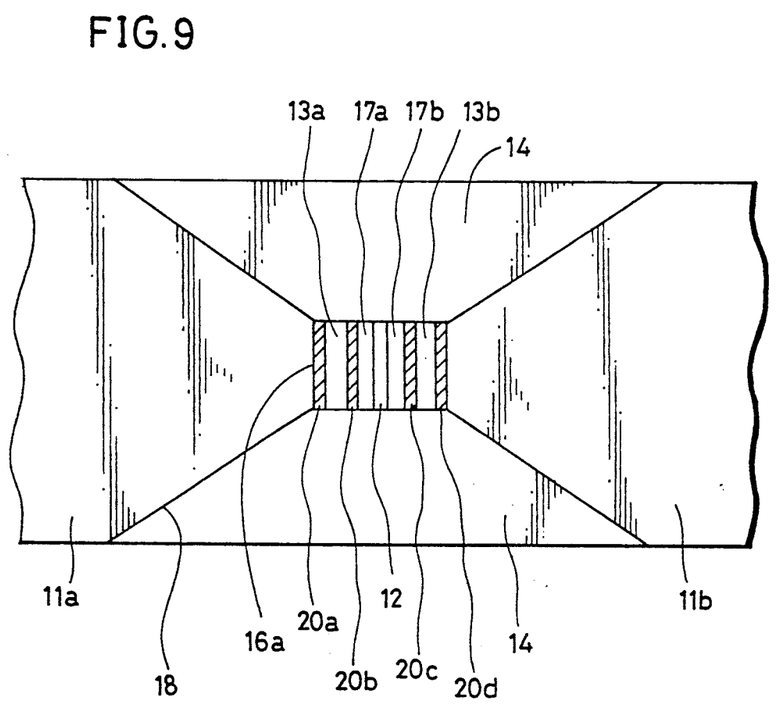
FIG. 9 is a plan view showing in detail the tape contact surface of the magnetic head of FIG. 2.

In the magnetic head of the present invention, diffusion preventing films 20b and 20c are formed between the first ferromagnetic metal thin films 13a, 13b and the second ferromagnetic metal thin films 17a and 17b, as shown in FIG. 9. The diffusion preventing films 20a and 20d may be formed between the magnetic core halves 11a, 11b and the first ferromagnetic metal thin films 13a and 13b. The diffusion preventing films 20a, 20b, 20c and 20d are formed of a non-magnetic material such as $SiO_2$, whose thickness is about 50 Å. The diffusion preventing films are formed to prevent reaction or diffusion between the first and second ferromagnetic metal thin films. If reaction or diffusion occurs between the first and second ferromagnetic metal thin films in a thermal processing steps such as welding during manufacturing of the magnetic head, the performance of the ferromagnetic metal thin films is degraded. More specifically, the constitution of Fe-Si-Aρ alloy constituting the first and second ferromagnetic metal thin film is changed due to the above reaction or diffusion, and the saturation flux density of the ferromagnetic thin films goes out of the prescribed range. In order to prevent such phenomenon, the diffusion preventing layers formed of heat resistant oxide such as $SiO_2$ are provided between the first and second ferromagnetic thin films.

The diffusion preventing film is formed in accordance with the following steps. Namely, a film of sendust or the like serving as the first ferromagnetic metal thin film is formed by sputtering on a member formed of Mn-Zn ferrite or the like serving as the magnetic core half. At this time, a film of $SiO_2$ or the like may be formed in advance as the diffusion preventing film on the member formed of Mn-Zn ferrite or the like. Then the diffusion preventing film is formed on the first ferromagnetic metal thin film. For example, a $SiO_2$ film having the thickness of 50 Å is formed. In a vacuum tank which is the same as in the step of forming the diffusion preventing film, the second ferromagnetic metal thin film is formed on the diffusion preventing film. Further, a film of non-magnetic material forming the magnetic gap is formed in the same vacuum tank on the second ferromagnetic metal thin film. All the steps of forming films are carried out in the same vacuum tank, since contamination such as dust or water attaches on the film forming surface if the magnetic core half member is taken out from the vacuum tank. To remove such contamination, reverse sputtering is carried out. However, this sputtering process affects the very thin diffusion preventing film or the second ferromagnetic metal thin film.

As described above, according to the present invention, a magnetic head having improved self recording reproducing capability in the low frequency region without degrading self recording reproducing capability in the high frequency region can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic head having a pair of magnetic core halves opposed to each other with a non-magnetic material posed therebetween to form a magnetic gap, said magnetic head comprising:

said pair of magnetic core halves formed of a ferromagnetic oxide, having opposing surfaces opposed to each other to form said magnetic gap;

a first ferromagnetic thin film formed at least on one of said opposing surfaces; and a second ferromagnetic thin film formed between said magnetic gap and said first ferromagnetic thin film; wherein magnetic flux density of said second ferromagnetic thin film induced when a 1.2K oersted magnetic field is applied thereto, exceeds 1000 gauss, and ratio of saturation flux density of said second ferromagnetic thin film to that of said first ferromagnetic thin film is not higher than 0.6.

2. A magnetic head according to claim 1, wherein the flux density of said second ferromagnetic thin film when a magnetic field of 1.2K oersted is applied exceeds 2000 gauss.

3. A magnetic head according to claim 1, wherein said first and second ferromagnetic thin films include an alloy of a same component element, with constituent ratio of the component element being different from each other.

4. A magnetic head according to claim 3, wherein said alloy is Fe-Si-A$\rho$ alloy.

5. A magnetic head according to claim 1, wherein said second ferromagnetic thin film has at least one different element added to elements constituting the first ferromagnetic thin film.

6. A magnetic head according to claim 5, wherein said added element is at least one of Ti, V, Cr, Zr, Nb, Mo, Hf, Ta, and W.

7. A magnetic head according to claim 1, further comprising a diffusion preventing film formed between the first and second ferromagnetic thin films.

8. A magnetic head according to claim 7, wherein said diffusion preventing film comprises $SiO_2$.

* * * * *